US010932457B2

(12) United States Patent
Elliott

(10) Patent No.: US 10,932,457 B2
(45) Date of Patent: Mar. 2, 2021

(54) BOBBER WITH PROGRAMMABLE ARMATURE

(71) Applicant: David LeaMon Elliott, Cary, NC (US)

(72) Inventor: David LeaMon Elliott, Cary, NC (US)

( * ) Notice: Subject to any disclaimer, the term of this patent is extended or adjusted under 35 U.S.C. 154(b) by 61 days.

(21) Appl. No.: 16/253,167

(22) Filed: Jan. 21, 2019

(65) Prior Publication Data
US 2020/0229416 A1  Jul. 23, 2020

(51) Int. Cl.
*A01K 93/00* (2006.01)
*A01K 97/01* (2006.01)
*A01K 91/06* (2006.01)

(52) U.S. Cl.
CPC ............ *A01K 93/00* (2013.01); *A01K 91/065* (2013.01); *A01K 97/01* (2013.01)

(58) Field of Classification Search
CPC ........ A01K 93/00; A01K 93/02; A01K 97/01; A01K 91/065
See application file for complete search history.

(56) References Cited

U.S. PATENT DOCUMENTS

| | | | | |
|---|---|---|---|---|
| 1,251,810 A * | 1/1918 | Oehler | ................... | A01K 91/02 43/26.1 |
| 3,645,030 A * | 2/1972 | Milburn, Jr. | ......... | A01K 91/065 43/26.1 |
| 4,602,451 A * | 7/1986 | Perez | ................... | A01K 91/065 43/26.1 |
| 4,757,635 A * | 7/1988 | Cole | ...................... | A01K 93/00 43/17.5 |
| 5,111,609 A * | 5/1992 | Flo | ........................ | A01K 91/065 43/26.1 |
| 5,535,538 A * | 7/1996 | Heuke | .................. | A01K 91/065 43/19.2 |
| 8,448,375 B1 * | 5/2013 | Blankenship | ........ | A01K 91/065 43/19.2 |
| 2005/0102883 A1 * | 5/2005 | Temes | .................... | A01K 93/00 43/26.1 |
| 2005/0138857 A1 * | 6/2005 | Markley | ................ | A01K 91/02 43/26.2 |
| 2005/0279010 A1 * | 12/2005 | Krog | ........................ | A01K 97/01 43/44.87 |
| 2017/0086438 A1 * | 3/2017 | Faulks | ................ | G06F 3/03547 |

FOREIGN PATENT DOCUMENTS

GB          2414911 A  * 12/2005  ............ A01K 93/02

* cited by examiner

*Primary Examiner* — Christopher R Harmon
(74) *Attorney, Agent, or Firm* — Niq Howard

(57) ABSTRACT

A bait mover fishing bobber having a battery, control circuit board, memory, a processor, a communication device, and a motor. The motor connects to coupling that extends through the wall of the lower housing. An armature which is located outside of the bobber connects to the opposing end of the coupling and to an opening on the antipodal side of the lower housing from the motor. The control circuit board is programmed to cause variations to the movement and interval of moments of the armature. The control circuit board contains components that allow the armature to be controlled from programs stored in its memory or by using an application on a mobile device. The armature is caused to move such that it engages with fishing line such that any bait on the end of the fishing line will that will move both vertically and horizontally.

18 Claims, 5 Drawing Sheets

BOBBER WITH PROGRAMMABLE ARMATURE

FIELD OF THE INVENTION

The present invention relates generally to fishing apparatus, and more particularly, to a bobber that contains programmable memory chips, a battery, a processor, and a servo motor that move an armature. This apparatus can be programmed or controlled remotely to move the baited end of a fishing line both horizontally and vertically. These combined movements result in bait or fishing lure being moved in a life-like manner.

DESCRIPTION OF PRIOR ART

A patentability investigation was conducted and the following U.S. Pat. Nos. were discovered:
U.S. Pat. No. 788,047—titled: BAIT MOVING DEVICE, Harry.
U.S. Pat. No. 1,251,810—titled: SUBMARINE MINNOW, Oehler.
U.S. Pat. No. 1,850,296—titled: FISHING DEVICE, Vermeulen.
U.S. Pat. No. 2,281,831—titled: FISHING BOB, Courvelle.
U.S. Pat. No. 3,645,030—titled: BAIT MOVING FISHING BOBBER, Milburn, Jr.
U.S. Pat. No. 4,420,900—titled: AUTOMATIC FISHING JIGGER, Nestor.
U.S. Pat. No. 4,602,451—titled: BAIT ACTIVATOR DEVICE, Perez et al.
U.S. Pat. No. 4,638,585—titled: MOTORIZED FISHING DEVICE AND METHOD, Korte
667899361—titled: LONGFISHERS APPARATUS Rodney, Dale
20050102883A1—titled: REMOTE CONTROL BOBBER, Temes
844837561—titled: FISHING APPARATUS, Blankenship
U.S. Pat. No. 815,246S1—titled: Fishing bobber, Barnett
U.S. Pat. No. 4,204,356A—titled: Underwater fishing lure reciprocating device, Laverne
U.S. Pat. No. 4,509,287A—titled: Fish trolling device, Hood
U.S. Pat. No. 5,111,609A—titled: Bait moving fishing bobber, Flo None of the foregoing prior art United States Paten Office teach or suggest the particular bait-activating fishing bobber of this invention.

For as long as fishing line has been used to catch fish, various tackle and fishing lures have been available. Fishing gear is often designed for a particular type of fishing. Some fishing tackle is designed to target a specific type of fish. Fishing lures vary in color shape and size. These lures can be drawn through the water to simulate indigenous aquatic life, or bait can simply be affixed to a hook and lowered into the water.

Fishing from a boat has always offered advantages not present when fishing from the bank or shore. Fish are often located near submerged items such as trees, rocks, or structural variations within the body of water. Boat fishing affords anglers the advantage of being able to suspend lures or bait into the area where the fish are located. Once the bait is suspended from a boat it can easily be moved around without removing the bait from the area where the fish are located. For example, an angler who is positioned in a boat can easily suspend a lure down into the branches of a submerged tree (FIG. 7). As the angler moves the bait to create life-like movement, it remains close to the tree. Alternatively, bank and shore fishing requires the bait to be thrown out and then reeled in past where fish are located. This process prevents the bait from remaining in the areas where the fish are located.

Currently there are many different configurations of fishing bobbers available to consumers. Bobbers, also known as floats, come in all sizes, shapes and colors. Most fishing bobbers currently available are manufactured from materials such as cork, polystyrene, plastic, metal and combinations of these buoyant materials.

Bobber fishing allows fisherman to present the bait at a specific depth in the water. Recognizing that successful fishing may be a function of the depth at which the bait is presented, experienced fishermen typically attach a bobber to the fishing line at a specific distance from the baited end of the line. Since the bait will tend to sink, while the bobber will tend to float, the specific distance between the bobber and the baited end of the line will determine the depth at which the bait will descend in the water (FIG. 8).

Certain bobbers, known as slip bobbers, operate differently. Slip bobbers are not attached to the line. Rather, the bait or lure is attached to the line below the bobber and pulls the line down through the bobber until the bobber stop hits the top of the bobber. The bobber stop is usually tied to the line at the desired distance above the bobber. The positioning of the bobber stop determines the depth at which the bait is suspended. This method of suspending the bait, allows the bait to be suspended at depths not possible with traditional bobbers.

It is well known that live bait will catch more fish than artificial lures. Accordingly, most lures are designed to imitate live bait. Several devices have been invented in the past that are designed to provide movement to the bait to simulate live bait. One of these devices is disclosed in U.S. Pat. No. 5,111,609 issued to Larry D. Flo on May 12, 1992. Flo's device merely raises and lowers the attached bait. Another device is disclosed in U.S. Pat. No. 4,420,900 issued to John M. Nestor on Dec. 20, 1983. Nestor's device like most of the prior art merely raises and lowers a fishing line providing an unnatural up and down movement. The present invention provides a programmable apparatus that has an armature that produces movement in both the horizontal and vertical directions. The movement or combination of movements results in a remarkably life-like motion. Other devices like the ones disclosed in U.S. Pat. Nos. 3,001,317; 2,908,103 and 4,349,978 provide for vibration or jiggling functions on a fishing rod. Other patents describing the closest subject matter provide for a number of more or less complicated features that fail to solve the problem in an efficient and economical way. None of these patents suggest the novel features of the present invention.

There have been several attempts at designing a fishing bobber with a reliable bait-moving mechanism. There have also been many different types of bobbers and slip bobbers. There are currently no other bobbers that have a reliable method for moving the bait in multiple directions. There are no other bobbers that effectively move the bait or lure both vertically and horizontally. None are programmable such that the movement imparted on the lure can be so precisely controlled. None allow the action on the bait to be controlled with a mobile application. All attempts at bobbers that move the bait fall short. Unfortunately, their design appears to have a few shortcomings. The main shortcoming is that other bobbers are not programmable, and they only move the bait up and down. None of the other bobber impart both vertical and horizontal motion with the use of an armature.

These and other features and advantages of the present invention will be explained and will become obvious to one skilled in the art through the summary of the invention that follows.

SUMMARY OF THE INVENTION

This invention relates to bobbers for fishing and more particularly to a bobber imparting motion to a fishing bait or lure. Objects of this invention are (1) to provide a device for imparting a life-like action or movement to an artificial lure or bait for fishing, (2) to provide a bobber that moves the bait using an armature, (3) to provide a programmable bobber that can vary the action or movement to an artificial lure or bait for fishing, (3) to provide a bait moving device of economical construction and assembly, and (4) to provide a bait moving bobber can be controlled remotely by a mobile device.

It is therefore the object of the present invention to provide a slip bobber with a preset and programmable activating arm.

These and other objects, features and advantages of this invention are disclosed in the following specification and accompanying drawings:

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like the reference materials indicate corresponding parts throughout several views.

REFERENCE NUMBERS IN DRAWINGS

Figure 1:
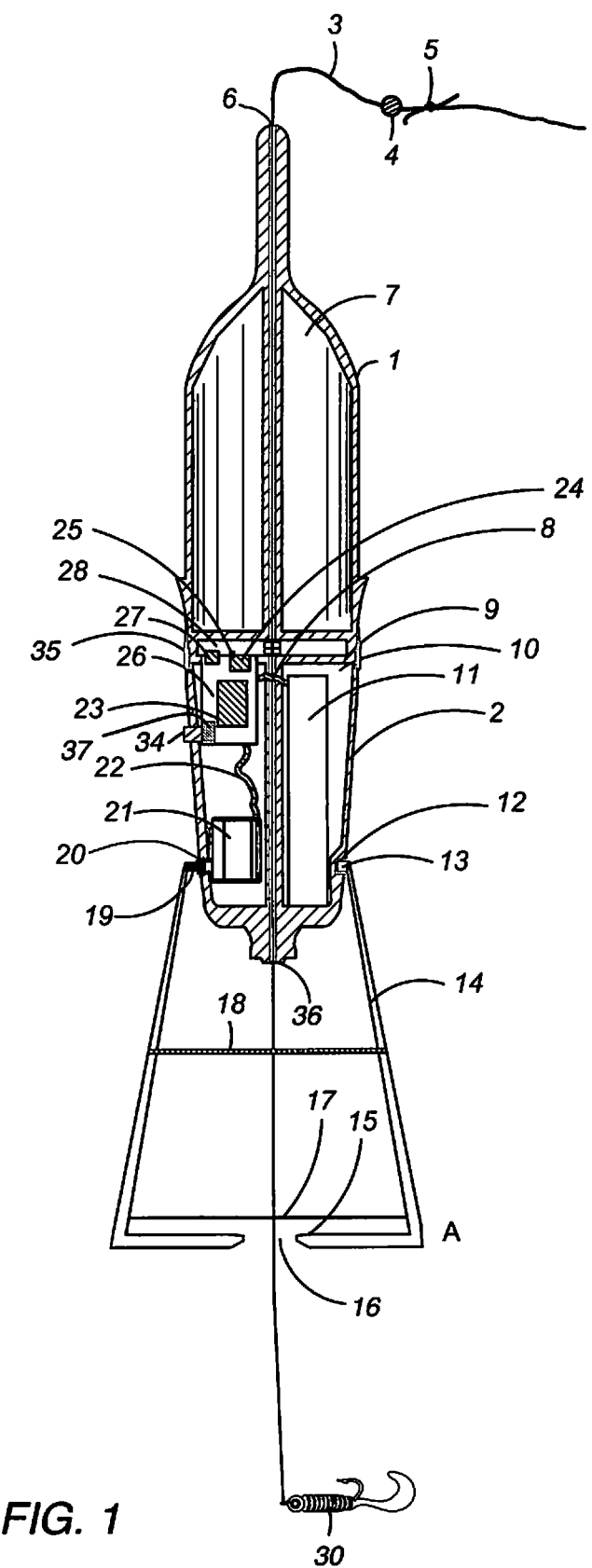
FIG. 1 is a diagram depicting a bobber with an exemplary embodiment of the present disclosure. It is a front sectional view of the Slip Bobber with the bait-moving armature. The armature is in the downward position.
Figure 2:
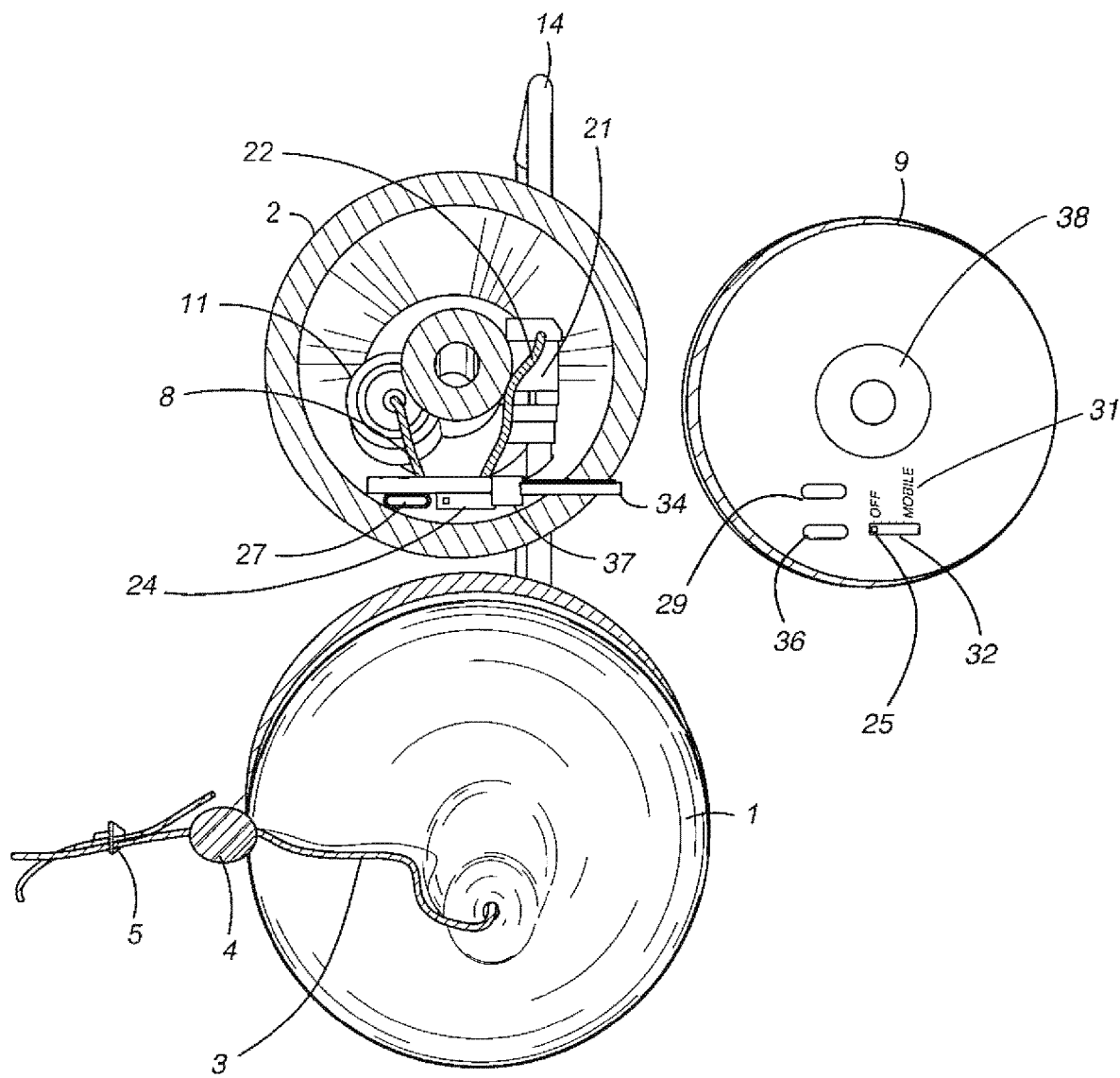
FIG. 2 is a diagram depicting the bobber in a top-disassembled view of the Slip Bobber with bait-moving armature in the downward position.
Figure 3:
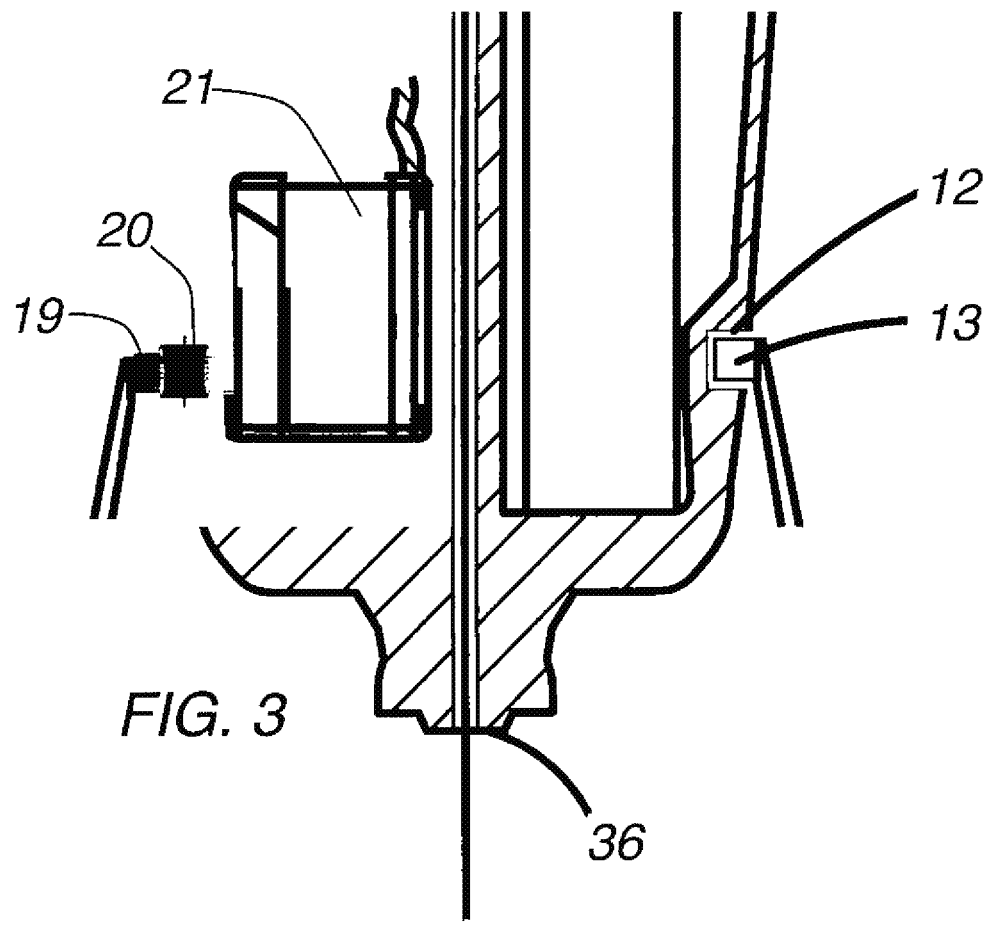
FIG. 3 is the exploded front sectional view of the Slip Bobber.
Figure 4:
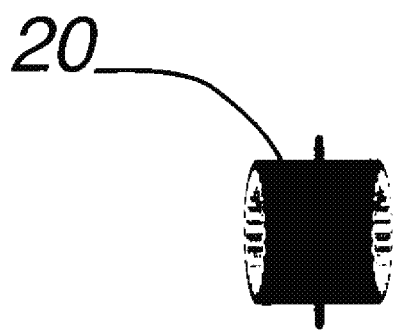
FIG. 4 is a view of the coupling that connects the servo motor to the armature.
Figure 5:
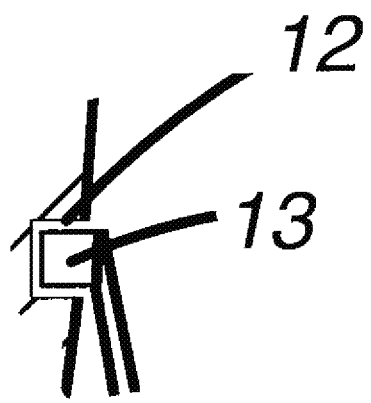
FIG. 5 is the exploded sectional view of the lower have of the bobber where the armature connects to the bobber opposite from the coupling.
Figure 6:
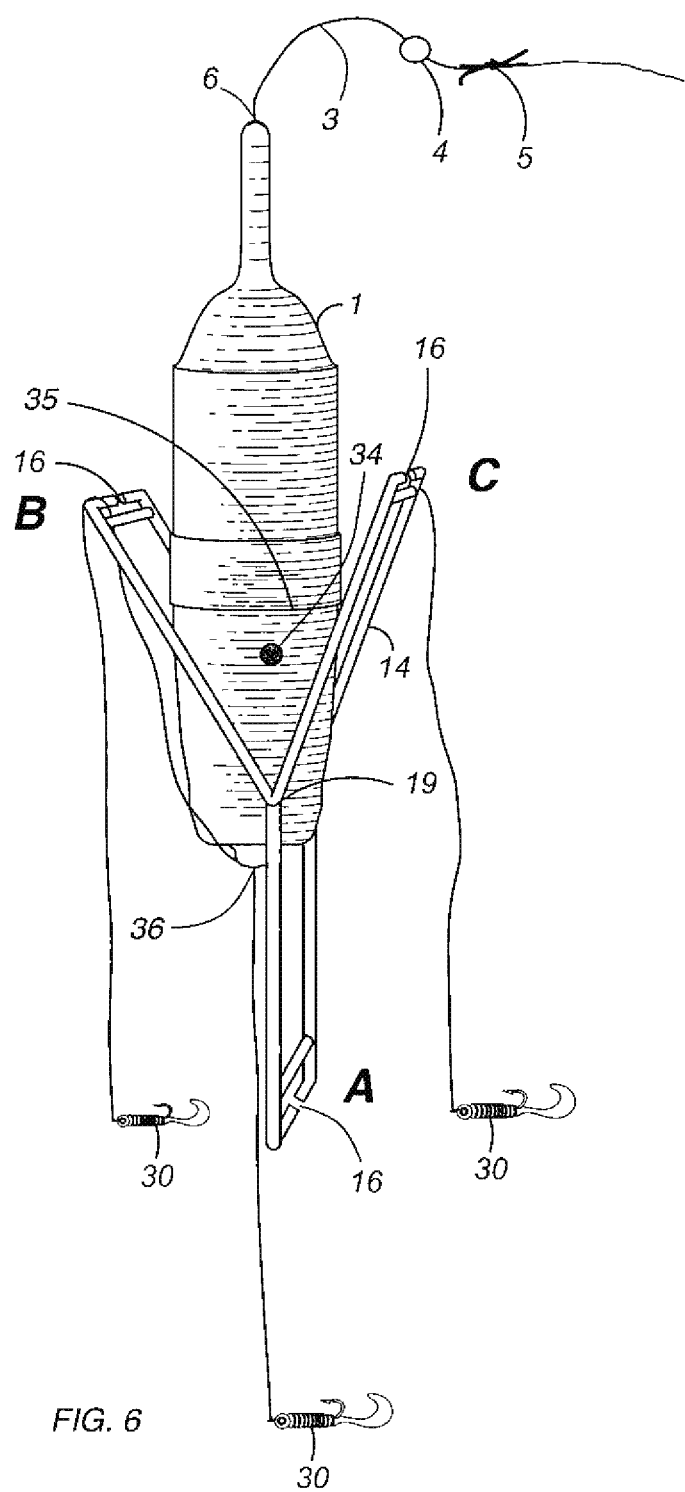
FIG. 6 is a left side external view of the Slip Bobber depicted in FIG. 1. The armature is depicted in three different locations. Position A is the downward position, Position B is with the armature moved all the way towards the back of the bobber, and Position C with the bobber rotated all the way to the front of the bobber.
Figure 7:
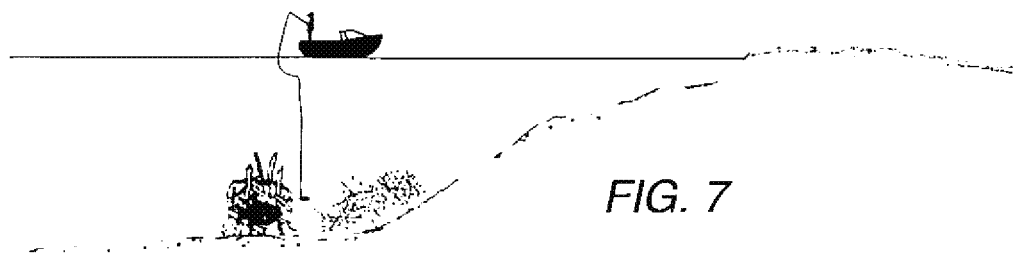
FIG. 7 is the view depicting the difference between boat and bank fishing.
Figure 8:
FIG. 8 is the view of this invention in use.

1 Top half of the bobber
2 Bottom half of the bobber
3 Fishing Line
4 Bead with hole through it
5 Slide Stop
6 Opening at top of the bobber -continued 7 Hollow area in upper half of the bobber
8 Wires from rechargeable battery to control circuit board
9 Bottom bobber cap
10 Open area in bottom half of bobber
11 Rechargeable
12 Cylindrical opening in bottom half of bobber
13 Cylindrical end of the armature
14 Armature
15 External horizontal bar
16 Line entry space in external horizontal bar
17 Internal horizontal bar
18 Support crossbar
19 Geared end of the armature
20 Rubber Servo Coupler
21 Servo motor
22 Wires connecting servo to control circuit board
23 Bluetooth transmitter/Memory chips
24 Armature selection controller
25 Switch for armature controller
26 Control circuit board
27 Micro USB charging/communication port
28 Open space between upper and lower sections
29 Flexible rubber cap for USB port
36 Opening to the USB port
31 Setting positions for armature controller
32 Opening in cap for the switch
34 Rubber bar that activates on/off switch
35 Threads where top screws onto the bottom
36 Hole where fishing line exits the bobber
37 On off switch on circuit board
38 Rubber O-ring

DETAILED DESCRIPTION OF THE PREFERRED EMBODIMENTS

The manner of using this Bobber with Programmable Armature is as follows:

(a) The bobber is prepared for use by first separating the top 1 and bottom 2 halves by unscrewing the top from the bottom. The top of the bobber has threaded groves 35 that allow it to connect with the bottom half.

(b) Once the bobber is apart, the user will insert the micro USB charger to charge the rechargeable battery.

(c) Once the battery is ready, the user moves the switch 25 to one of the four preprogrammed movements or they select mobile if the wish to control the bobber via a mobile application.

(d) After selecting a movement option. The top of the bobber is screwed onto the bottom half.

(e) The armature is made of a flexible material that allows it to be flexed apart such that when it is released, the tension causes it to connect to the coupling 20 which extends from the servo motor. The other end of the armature fits in the opening on the opposite side 12.

(f) Next, the angler must first determine how much fishing line they want to hang below the bobber. They need to place an enlargement 5 on the fishing line 3 at the point that they want the fishing line to stop at the top of the bobber. This enlargements can be produced by simply tying a piece of rubber band or thread around the fishing line. Wrapping the rubber band or thread around the fishing line enough times to create a large enough enlargement.

(g) The fishing line can also be passed through a plastic bead 4 before it is threaded through the bobber. The bead must have a hole slightly larger than the fishing line. This will allow the enlargement to be kept very small. The smaller the enlargement, the easier that the enlargement will reel through the eyes of the fishing pole and into the fishing reel.

(h) Next, they need to slide their fishing line down through the longitudinal passage 6 in the bobber. Pulling the amount of fishing line that they want to hang below the bobber.

(i) Now the hook or lure 30 can be tied to the end of the fishing line that hangs below the bobber.

(j) Once the bait is attached, the line can be reeled up onto the reel. The enlargement 5 and the bead 4 that are on the line are reeled up into the reel allowing the user to easily cast the bobber with minimal line between the rod tip and the bait.

(k) Next, the angler presses the on/off rubber button 34. This will initiate a timing sequence that will activate the motor after a five second delay. The Slip Bobber with bait-moving device is now ready to use.

(l) After casting the Slip Bobber into the water. The Slip Bobber with bait-moving device will float in a vertical position until the bobber enlargement 5 and bead 4 make contact with the top of the bobber.

(m) After casting the bobber and the line is pulled through it until the enlargement 5 reaches the top of the bobber. The weight of the hook or lure will pull the fishing line down through the longitudinal passage in the cross bar 15. The line will then be resting on inner crossbar 16.

(n) The computer will then execute one of the programs located in its memory to cause the motor servo 21 to turn the coupling 20. This will cause the servo gear to engage with the geared end of the armature 19. The armature 14 will then cause movement on the fishing line 29. The computer will send both power to the servo motor through the cables indicated by 22.

(o) The programs that control the computer 23 will be held in memory chips located on the control circuit board 26.

(p) The motherboard 26 will also have a Bluetooth device that will allow the user to control the movement of the servo motor using another Bluetooth device such as a phone, tablet, or other device.

(q) The control circuit board will have a micro USB port 27 that will allow the rechargeable battery 11 to be charged.

(r) Power to and from the battery will be through the wires indicated by 8.

(s) The USB port 27 will also serve as another means of programming the bobber.

(t) The control circuit board will also have a switch 25 that will allow for manual settings to be made.

(u) The armature 14 is held in place by the tension caused by moving items 19 and 13 away from each other.

(v) Item 13 is a small cylinder end of the armature that fits into a whole 12 on the body of the bobber.

(w) Item 19 is the end of the armature 14 and has gears that fit into the coupling 20 that connects to the servo motor 21.

(x) Item 20 has a ring around it that prevents water from entering the body 2 of the bobber.

(y) The bait moving mechanism 14 is located on the bottom and rotates through approximately 340 degrees. Which provides both up and down and side to side movement.

(z) The armature 14 can have multiple shapes and designs that will impact the motion of the bait.

In this embodiment and alternate bobber housing would be used. A round bobber like a traditional bobber with the same functioning armature.

CONCLUSIONS, RAMIFICATIONS AND SCOPE

The bobber with programmable armature will be a very useful aid to anglers. Furthermore, the bobber with programmable armature has additional advantages in that it allows an angler to not only present a lure at any depth, but it will impart life like motion on any bait. The bobber with programmable armature will increase fish that are caught by causing artificial lures to move with remarkable lifelike movements. This not only catches more fish, but it allows an angler to fish with a different pole while the pole using this device fishes by itself.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed as new is as follows:

1. A bait activating bobber comprising:
   a housing;
     the housing having an exterior surface;
     the exterior surface having a length extending a perimeter around the housing;
   a control circuit board;
   a power supply;
   a motor;
     the motor operably connected to a coupler;
   an armature;
     the armature extending a length from a first end to a second end;
     the first end of the armature having one geared end securely fitting in the coupler;
     the second end of the armature operably connected to an opening of the housing;
   a bait;
   wherein the armature rotates about an axis between a first point of the exterior surface of the housing and a second point of the exterior surface of the housing, when the coupler is caused to rotate by the motor;
   wherein the rotation of the armature about the axis between the first point of the exterior surface of the housing and the second point of the exterior surface of the housing causes the bait to move in a plurality of directions.

2. The bait activating bobber of claim 1, further comprising:
   wherein the motor is a servo motor.

3. The bait activating bobber of claim 1, further comprising:
   a wireless communication means.

4. The bait activating bobber of claim 1; further comprising:
   the housing having a lower housing;
     the lower housing having a threaded section;
   the housing having an upper housing;
     the upper housing having a section which accepts the threaded section of the lower housing;
   wherein when the threaded section of the lower housing is screw fit to the section which accepts the threaded section of the lower housing of the upper housing, the connection creates a waterproof seal for an interior space of the housing.

5. The bait activating bobber of claim 1, further comprising:
   a processor;

wherein said processor and said control circuit board is configured to store a plurality of movement instructions comprising: pauses, distances, and speeds;

wherein said processor and said control circuit board control said motor causing the bait to move in a plurality of directions.

6. The bait activating bobber of claim 1, further comprising: an on off switch.

7. The bait activating bobber of claim 1, further comprising:

wherein the opening of the housing is cylindrical.

8. The bait activating bobber of claim 1, further comprising:

wherein the opening of the housing is hemispherical.

9. The bait activating bobber of claim 1; further comprising:

the armature having a plurality of outer bars;
the armature having a plurality of inner bars;
the bait operably connected to a line;
wherein the plurality of outer bars are configured to receive the line in a space between the plurality of inner bars and the plurality of outer bars.

10. The bait activating bobber of claim 1, further comprising:

wherein the motor is controlled by instructions sent from a mobile device.

11. The bait activating bobber of claim 1, further comprising:

wherein the bobber has a heating element.

12. The bait activating bobber of claim 1, further comprising:

a heating element;
a plurality of heat dispensing fins.

13. The bait activating bobber of claim 1, further comprising: a plurality of light features.

14. The bait activating bobber of claim 1, further comprising:

wherein the power supply is a plurality of solar panels.

15. The system of claim 1, further comprising:

wherein the power supply is a plurality of batteries.

16. A lure activating bobber comprising:

a housing;
the housing having an exterior surface;
the exterior surface having a length extending a perimeter around the housing;
a control circuit board;
at power supply;
a processor;
a motor;
the motor operably connected to a coupler;
an armature;
the armature extending a length from a first end to a second end;
the armature operably connected to the coupler;
a lure;
wherein the armature rotates about an axis between a first point of the exterior surface of the housing and a second point of the exterior surface of the housing, when the coupler is caused to rotate by the motor;
wherein the rotation of the armature about the axis between the first point of the exterior surface of the housing and the second point of the exterior surface of the housing causes the bait to move in a plurality of directions.

17. The system of claim 16, further comprising:

a wireless communication means.

18. The system of claim 16, further comprising:

wherein the power supply is a plurality of batteries.

* * * * *